(12) United States Patent
Clark et al.

(10) Patent No.: US 7,975,917 B2
(45) Date of Patent: *Jul. 12, 2011

(54) PROVIDING DIRECTED CONTENT TO ANONYMOUS CUSTOMERS

(75) Inventors: Todd Clark, Dallas, TX (US); David J. O'Neill, Falls Church, VA (US); Ethan Fox, Bethesda, MD (US)

(73) Assignee: Verizon Business Global LLC, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/580,646

(22) Filed: Oct. 16, 2009

(65) Prior Publication Data

US 2010/0032482 A1   Feb. 11, 2010

Related U.S. Application Data

(63) Continuation of application No. 11/177,559, filed on Jul. 11, 2005, now Pat. No. 7,624,923.

(51) Int. Cl.
*G06K 15/00* (2006.01)
(52) U.S. Cl. ............... 235/383; 235/375; 705/28
(58) Field of Classification Search ............ 235/383, 235/375, 381, 440, 462.45, 487; 705/14, 705/20, 26–28
See application file for complete search history.

(56) References Cited

U.S. PATENT DOCUMENTS

| 6,313,745 | B1 | 11/2001 | Suzuki | |
|---|---|---|---|---|
| 6,354,492 | B1 | 3/2002 | Powell et al. | |
| 6,510,434 | B1* | 1/2003 | Anderson et al. | 1/1 |
| 6,564,189 | B1 | 5/2003 | Nycz | |
| 7,413,124 | B2 | 8/2008 | Frank et al. | |
| 2002/0170961 | A1 | 11/2002 | Dickson et al. | |
| 2003/0004798 | A1 | 1/2003 | McAuliffe et al. | |
| 2003/0233278 | A1 | 12/2003 | Marshall | |
| 2004/0039659 | A1 | 2/2004 | Niwa | |
| 2004/0238629 | A1 | 12/2004 | Buchholz | |
| 2005/0049914 | A1 | 3/2005 | Parish | |
| 2005/0055273 | A1 | 3/2005 | Phillips et al. | |
| 2005/0149391 | A1 | 7/2005 | O'Shea et al. | |
| 2005/0149414 | A1 | 7/2005 | Schrodt et al. | |
| 2006/0059049 | A1 | 3/2006 | Morris et al. | |
| 2006/0125604 | A1 | 6/2006 | Vaiana | |
| 2006/0175402 | A1 | 8/2006 | Maitin | |
| 2007/0119955 | A1* | 5/2007 | Barenburg et al. | 235/494 |
| 2008/0027796 | A1 | 1/2008 | Chaves | |
| 2008/0086484 | A1* | 4/2008 | Darnell et al. | 707/10 |

* cited by examiner

*Primary Examiner* — Edwyn Labaze

(57) ABSTRACT

A method includes electronically identifying a first item that a customer intends to purchase while the customer is shopping and electronically providing content to the customer in response to the identifying to entice the customer to purchase a second, different item.

33 Claims, 12 Drawing Sheets

PROVIDING DIRECTED CONTENT TO ANONYMOUS CUSTOMERS

RELATED APPLICATIONS

This application is a continuation of U.S. patent application Ser. No. 11/177,559, filed Jul. 11, 2005, which is incorporated herein by reference.

FIELD OF THE INVENTION

Implementations consistent with the principles of the invention relate generally to communications networks and, more particularly, to systems and methods for providing content to customers.

BACKGROUND OF THE INVENTION

Retailers typically invest a large amount of time attempting to develop various techniques for influencing the purchasing decisions made by retail customers. One such technique involves advertising the items (e.g., goods and/or services) provided by the retailer, using direct mailings, newspapers, fliers, magazines, radio, television, and banners, in an attempt to entice customers to buy these items.

While these techniques may entice customers to visit the particular retail establishment to purchase an advertised item, these techniques do not, however, influence a customer's buying decision regarding other items provided by the retail establishment while the customer is shopping at the retail establishment.

SUMMARY OF THE INVENTION

In an implementation consistent with the principles of the invention, a method includes reading, via a device, a tag associated with a first item that a customer intends to purchase. The method further includes presenting content to the customer in response to the identifying, where the content identifies a second item relating to the first item.

In another implementation consistent with the principles of the invention, a system includes a first component, a second component, and a third component. The first component is configured to read information from a first tag associated with a first item, and transmit the information. The second component is configured to receive the transmitted information, use the transmitted information to identify content for a user, where the content relates to a second item, and transmit the identified content. The third component is configured to receive the identified content, and present the identified content to the user.

In still another implementation consistent with the principles of the invention, a method includes reading an RFID tag associated with a first item that a customer intends to purchase and providing content about a second item to the customer in response to the reading.

In a further implementation consistent with the principles of the invention, a method includes electronically identifying a first item that a customer intends to purchase while the customer is shopping and electronically providing content to the customer in response to the identifying to entice the customer to purchase a second, different item.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention provide content to customers while they are shopping at a store. In one exemplary implementation, items placed in a customer's shopping cart or shopping basket are detected and content provided to the customer based on the detected items. For example, if a customer's cart included a box of cereal, content may be provided to the customer indicating that milk is currently on sale at the store. The content may be visually and/or audibly provided to the customer. In this way, anonymous customers may be enticed into buying additional items before the point of sale (i.e., before reaching the cash register), thereby improving in-store sales.

Exemplary System

Figure 1:
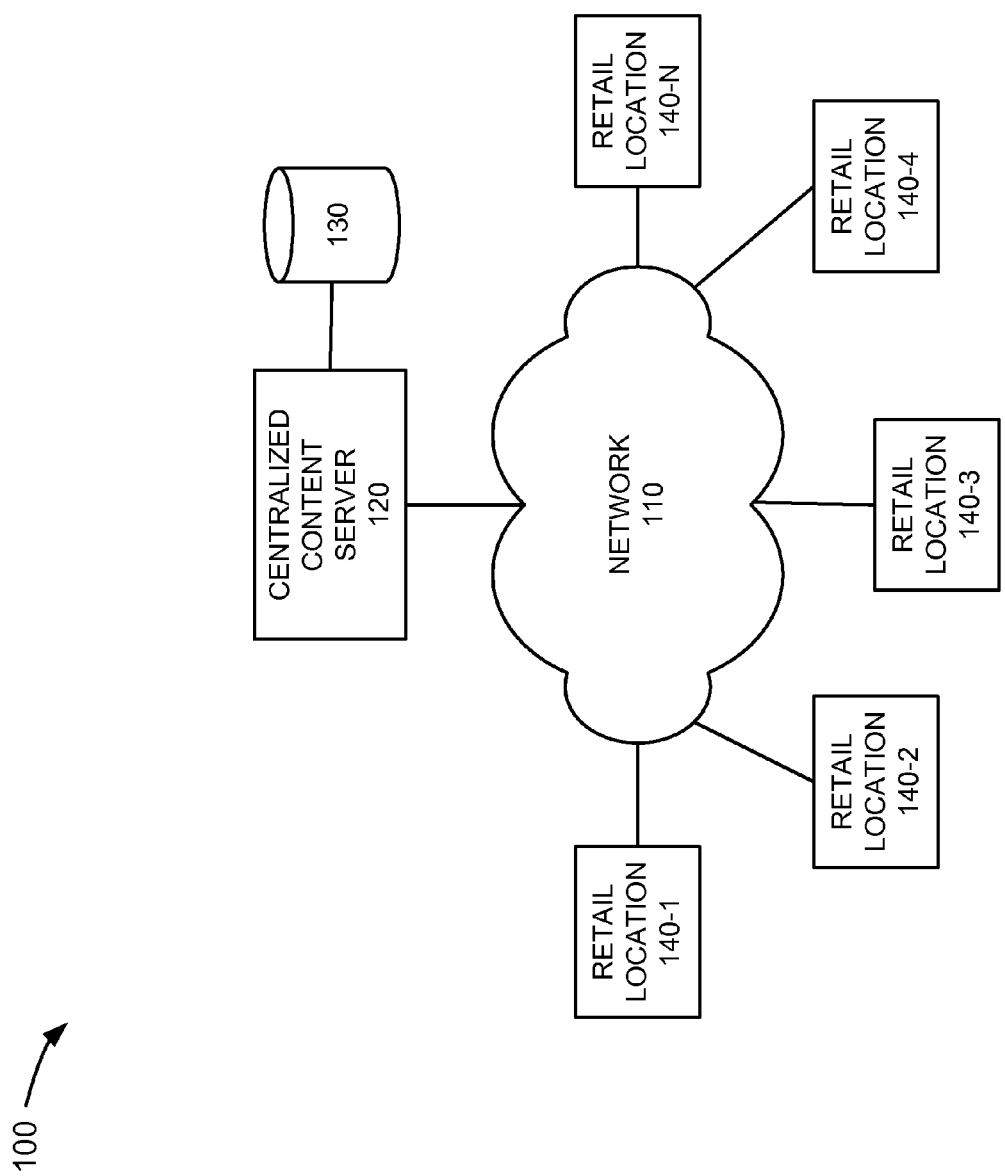
FIG. 1 illustrates an exemplary system in which systems and methods, consistent with the principles of the invention, may be implemented.

FIG. 1 illustrates an exemplary system 100 in which systems and methods, consistent with the principles of the invention, may be implemented. For explanatory purposes only, system 100 will be described in relation to a group of retail locations that sells items, such as a department store, a grocery store, etc. It will be appreciated, however, that the techniques described herein are equally applicable to other types of environments.

As illustrated, system 100 may include a group of retail locations 140-1 through 140-N (referred to collectively as "retail locations 140") that connect to a centralized content server 120 via a network 110. Centralized content server 120 may be associated with a database 130. The number of centralized content servers 120, databases 130, and retail locations 140 illustrated in FIG. 1 is provided for simplicity. In practice, system 100 may include more or fewer centralized content servers 120, databases 130, and retail locations 140 than illustrated in FIG. 1.

Network 110 may include, for example, the Internet, an intranet, a local area network (LAN), a metropolitan area network (MAN), a wide area network (WAN), a public switched telephone network (PSTN), and/or some other type of network. In fact, network 110 may include any type of network or combination of networks that permits routing of information from a particular source to a particular destination.

Centralized content server 120 may include any type of computer-like device, such as a personal computer, a mainframe computer, a laptop, etc., threads or processes running on these devices or other types of devices, and/or objects executable by these devices. In one implementation, server 140 may receive information from retail locations 140 and provide content to retail locations 140 via network 110.

Database 130 may store content to be provided to retail locations 140. The content may include, for example, audible or visual content relating to items provided at retail locations 140. Database 130 may be located within centralized content server 120 or external to centralized content server 120.

Each retail location 140-1 through 140-N may include a retail establishment (or store), such as a department store, a grocery store, a sporting goods store, or any other type of retail establishment. As will be described in detail below, each retail location 140-1 through 140-N may provide content to anonymous customers while the customers are still shopping at the retail location 140-1 through 140-N. In this way, anonymous customers are enticed to purchase additional items prior to reaching the cash register.

Centralized content server 120, database 130, and retail locations 140 may communicate with each other via wired, wireless, and/or optical connections. It will be appreciated that while a single centralized content server 120 and database 130 are illustrated in FIG. 1, centralized content server 120 and/or database 130 may be implemented as two or more possibly distributed devices in other implementations consistent with the principles of the invention.

Exemplary Content Server Configuration

Figure 2:
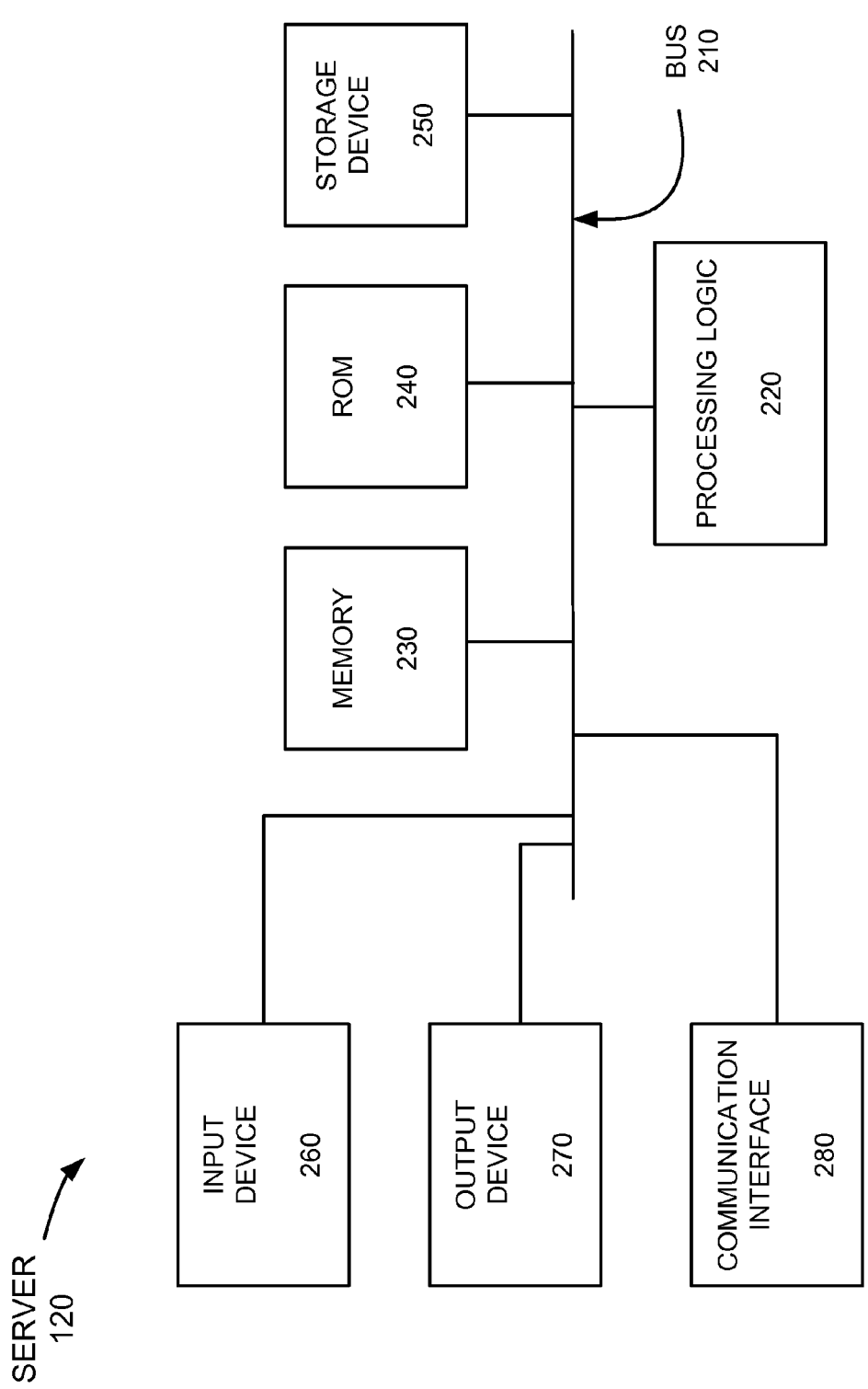
FIG. 2 illustrates an exemplary configuration of the content server of FIG. 1 in an implementation consistent with the principles of the invention.

FIG. 2 illustrates an exemplary configuration of centralized content server 120 in an implementation consistent with the principles of the invention. As illustrated, server 120 may include a bus 210, processing logic 220, a memory 230, a read only memory (ROM) 240, a storage device 250, an input device 260, an output device 270, and a communication interface 280. It will be appreciated that server 120 may include other components (not shown) that aid in receiving, transmitting, and/or processing data. Moreover, it will be appreciated that other configurations are possible.

Bus 210 may permit communication among the components of server 120. Processing logic 220 may include any type of processor or microprocessor that interprets and executes instructions. In other implementations, processing logic 220 may be implemented as or include an application specific integrated circuit (ASIC), field programmable gate array (FPGA), or the like. Memory 230 may include a RAM or another type of dynamic storage device that stores information and instructions for execution by processing logic 220. ROM 240 may include a ROM device and/or another type of static storage device that stores static information and instructions for processing logic 220. Storage device 250 may include a type of magnetic or optical recording medium and its corresponding drive for storing information and/or instructions.

Input device 260 may include a device that permits an operator to input information to server 120, such as a keyboard, a keypad, a mouse, a pen, a microphone, one or more biometric mechanisms, and the like. Output device 270 may include a device that outputs information to the operator, such as a display, a printer, a speaker, etc.

Communication interface 280 may include any transceiver-like mechanism that enables server 120 to communicate with other devices and/or systems. For example, communication interface 280 may include mechanisms for receiving information from and transmitting information to retail locations 140 via a network, such as network 110.

As will be described in detail below, server 120, consistent with the principles of the invention, may receive information from retail locations 140 and provide content to retail locations 140. Server 120 may perform these and other services in response to processing logic 220 executing software instructions contained in a computer-readable medium, such as memory 230. A computer-readable medium may be defined as one or more memory devices and/or carrier waves. The software instructions may be read into memory 230 from another computer-readable medium, such as data storage device 250, or from another device via communication interface 280. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Exemplary Database Configuration

Figure 3:
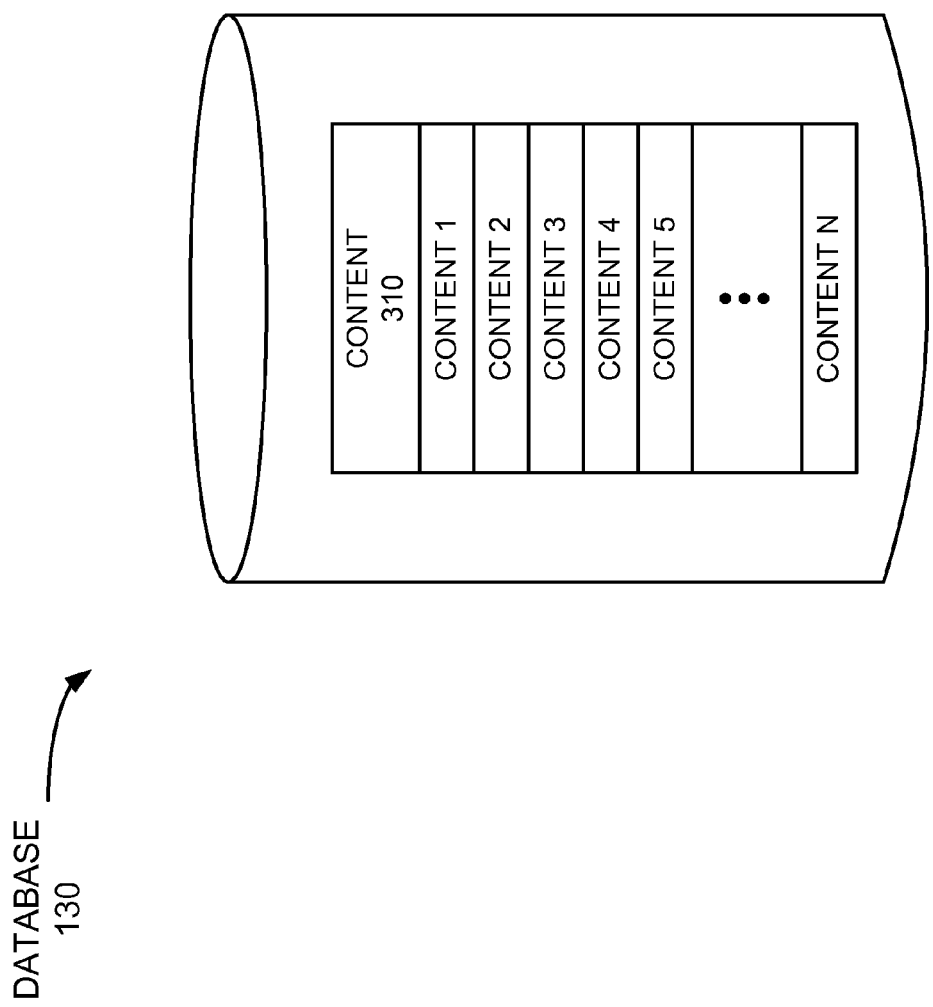
FIG. 3 illustrates an exemplary configuration of the database of FIG. 1 in an implementation consistent with the principles of the invention.

FIG. 3 illustrates an exemplary configuration of database 130 in an implementation consistent with the principles of the invention. While only one database is described below, it will be appreciated that database 130 may consist of multiple databases stored locally at server 120, or stored at one or more different and possibly remote locations.

As illustrated, database 130 may include a group of entries in a content field 310. Database 130 may contain additional fields (not shown) that aid server 120 in providing content to retail locations 140.

Content field 310 may store or identify content that is to be provided to retail locations 140. The content may relate to items or combination of items provided at retail locations 140. For example, if retail location 140-1 is an electronics store, then content field 310 may store or identify content relating to electronic items offered by retail location 140-1.

The content may include visual and/or audible content. For example, the content may include visual content, such as video or text, or audio content about the items provided at retail locations 140. The content may also indicate the location of an item at the retail location to facilitate the customer's ability to obtain the item.

In one implementation consistent with the principles of the invention, database 130 may also store information identifying items provided at retail locations 140. For example, database 130 may associate a particular content in content field 310 with an item (or combination of items) provided at one or more of retail locations 140 in a manner similar to that described below with respect to FIG. 8. The association of content to items may be configurable by an administrator and changed as often as is needed. For example, if DVD movies are currently on sale at retail location 140-1, an administrator may change the content in field 310 relating to DVD players and cause this new content to be transmitted to retail location 140-1 so that this sale item is presented to any customer intending to purchase a DVD player at retail location 140-1. When the sale is over, the administrator may, for example, change the content to identify other items that relate to DVD players (e.g., cables) that are available for purchase at retail location 140-1.

As will be described in detail below, server 120 may use database 130 to provide content to retail locations 140. Server 120 may cause the content to be provided to retail locations 140 in response to a command from an administrator of server 120, automatically upon new content being provided to database 130, in response to a request from a retail location 140-1 through 140-N, or the like.

Exemplary Retail Location Configuration

Figure 4:
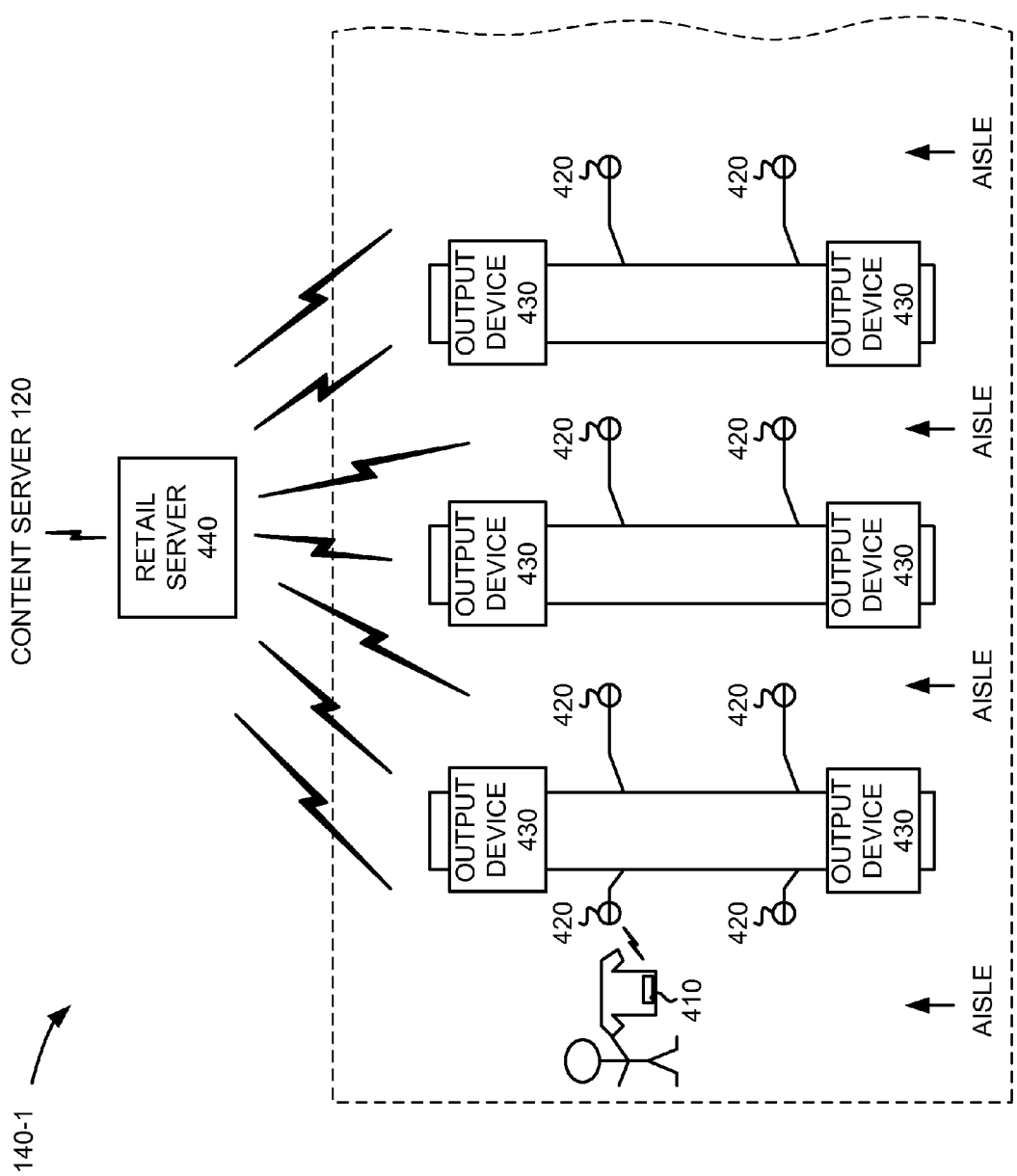
FIG. 4 illustrates an exemplary configuration of a retail location of FIG. 1 in an implementation consistent with the principles of the invention.

FIG. 4 illustrates an exemplary configuration of a retail location, such as retail location 140-1, in an implementation consistent with the principles of the invention. As illustrated, retail location 140-1 includes a tag 410, sensors 420, output devices 430, and a retail server 440. The number of tags 410, sensors 420, output devices 430, and retail servers 440 illustrated in FIG. 4 is provided for simplicity. In practice, a typical system could include more or fewer tags 410, sensors 420, output devices 430, and retail servers 440 than illustrated in FIG. 4.

Tag 410 may include any type of tag that may be associated with an item at retail location 140-1 and that may store information regarding the item. In one implementation, tag 410 may include a radio frequency identification (RFID) tag. In this implementation, tag 410 may transmit stored information in response to radio frequency waves. In exemplary implementations consistent with the principles of the invention, tag 410 may be affixed to the item in a well-known manner. For example, tag 410 may be embedded in the item, attached to the surface of the item by a label or adhesive, or otherwise physically associated with the item.

Each sensor 420 may include one or more devices that are capable of obtaining information from tag 410. In one implementation consistent with the principles of the invention, each sensor 420 may include one or more RFID sensors. Each sensor 420 may receive information from any tags 410 that are in proximity to sensor 420 and forward the information (or some portion of the information) to server 440. As illustrated in FIG. 4, sensors 420 may, in one implementation consistent with the principles of the invention, be positioned in locations within retail location 140-1. For example, sensors 420 may be located in aisles of retail location 140-1.

Each output device 430 may include one or more devices capable of providing content to customers of retail location 140-1. For example, each output device 430 may include a display device (e.g., a monitor, a television, etc.), an audio device (e.g., a speaker), and/or a printing device. In one implementation, each output device 430 may be positioned in close proximity to one or more sensors 420.

Retail server 440 may include any type of computer-like device, such as a personal computer, a mainframe computer, a laptop, etc., threads or processes running on these devices or other types of devices, and/or objects executable by these devices. In one implementation, retail server 440 may receive information from sensors 420 and provide content for customers to output devices 430. Retail server 440 may be located within retail location 140-1 or external to retail location 140-1. Retail server 440 may obtain content for providing to customers from database 130 associated with centralized content server 120. In one implementation consistent with the principles of the invention, centralized content server 120 and retail server 440 may form part of an Enterprise Content Delivery Network (ECDN). Retail server 440 may include caching software that enables retail server 440 to store content from centralized content server 120. In this way, content may be served many times at retail locations 140, but only traverse network 110 once. By storing needed content locally at retail server 440, content may be quickly provided to customers at retail location 140-1.

Sensors 420, output devices 430, and server 440 may communicate with each other via wired, wireless, and/or optical connections. In some situations, a sensor 420 may perform a function of an output device 430 and/or server 440, an output device 430 may perform a function of a sensor 420 and/or server 440, or server 440 may perform a function of a sensor 420 and/or output device 430. Moreover, it will be appreciated that one or more sensors 420, output devices 430, and servers 440 may be included within a single device (e.g., a single hand-held device).

Exemplary Tag Configuration

Figure 5:
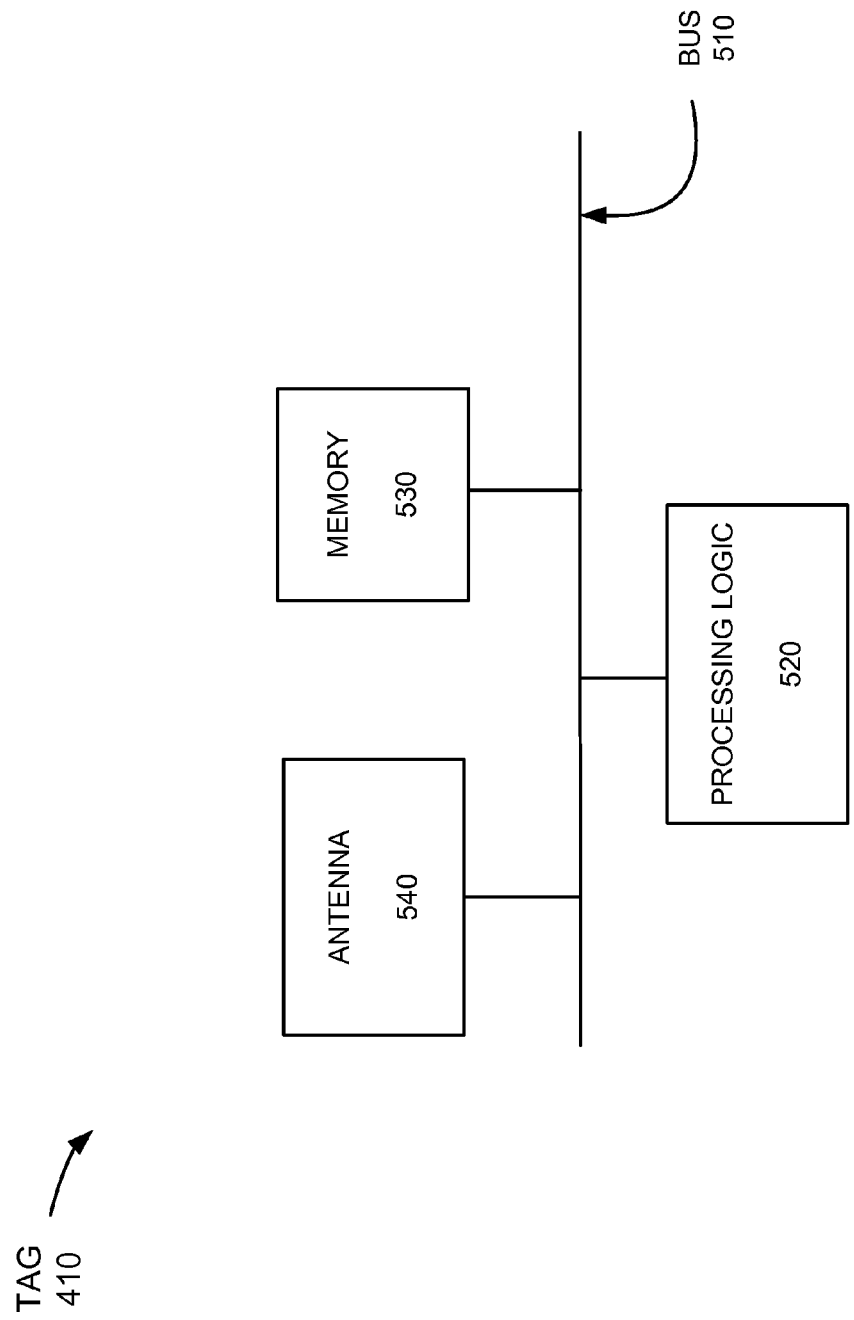
FIG. 5 illustrates an exemplary configuration of the tag of FIG. 4 in an exemplary implementation consistent with the principles of the invention.

FIG. 5 illustrates an exemplary configuration of a tag, such as tag 410, in an exemplary implementation consistent with the principles of the invention. As illustrated, tag 410 may include a bus 510, processing logic 520, a memory 530, and an antenna 540. It will be appreciated that tag 410 may include other components (not shown) that aid in receiving, transmitting, and/or processing data. Moreover, it will be appreciated that other configurations are possible. For example, tag 410 may not include processing logic 520 and/or memory 530 in other implementations consistent with the principles of the invention.

Bus 510 may permit communication among the components of tag 410. Processing logic 520 may include any type of processor or microprocessor that interprets and executes instructions. In other implementations, processing logic 520 may be implemented as or include an ASIC, FPGA, or the like. Memory 530 may include a RAM or another type of dynamic storage device that stores information and instructions for execution by processing logic 520 and/or a ROM or another type of static storage device that stores static information and instructions for processing logic 520. Antenna 540 may include any type of antenna capable of receiving and/or transmitting data. In one implementation, antenna 540 may include any type of antenna commonly used in RFID tags, such as, for example, an inductive antenna, a capacitive antenna, a printed dipole antenna, a coil antenna, etc.

As will be described in detail below, tag 410, consistent with the principles of the invention, may perform functions in response to processing logic 520 executing software instructions contained in a computer-readable medium, such as memory 530. The software instructions may be read into memory 530 from another computer-readable medium or from another device via antenna 540. The software instructions contained in memory 530 may cause processing logic 520 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Exemplary Sensor Configuration

Figure 6:
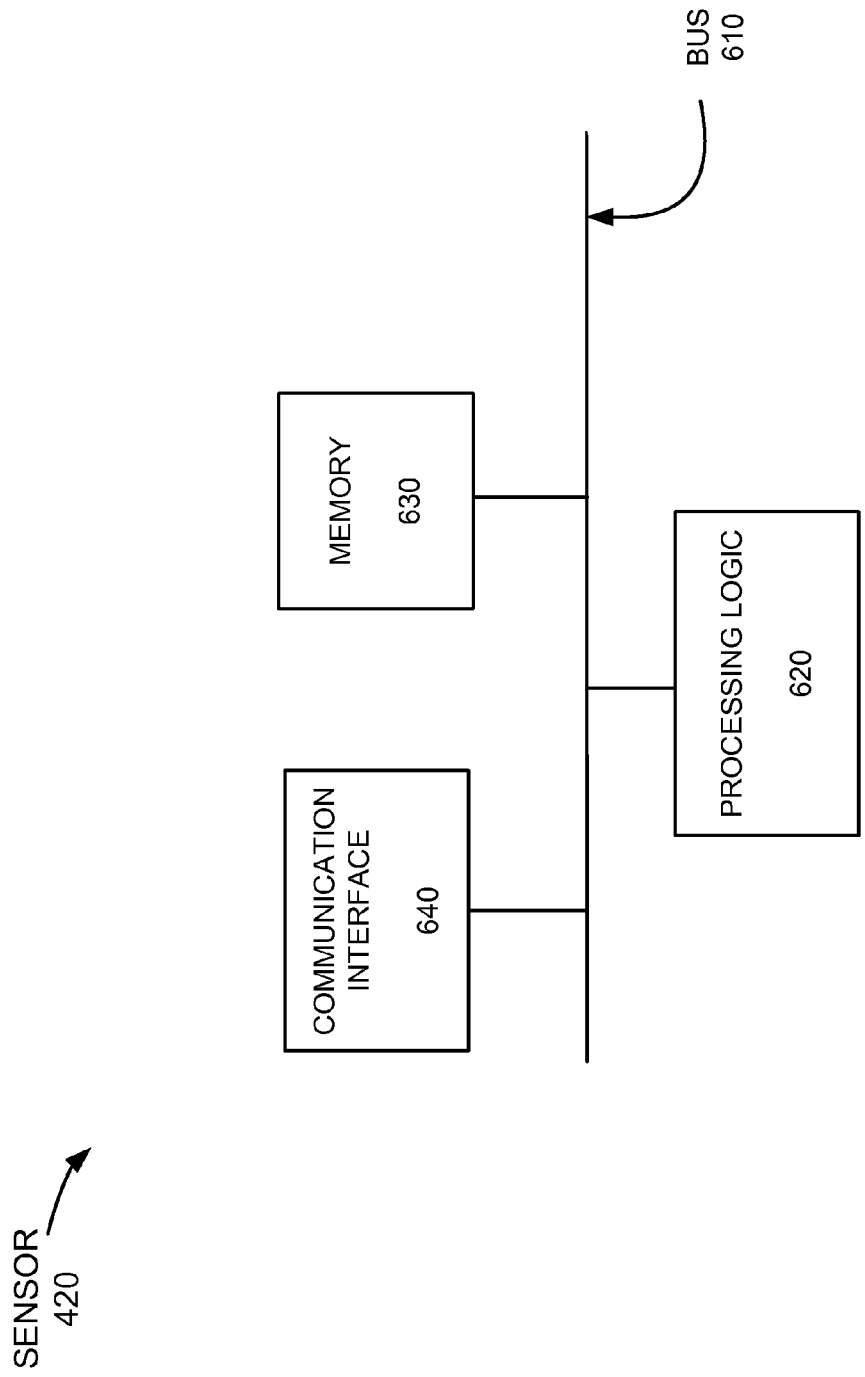
FIG. 6 illustrates an exemplary configuration of the sensor of FIG. 4 in an exemplary implementation consistent with the principles of the invention.

FIG. 6 illustrates an exemplary configuration of a sensor, such as sensor 420, in an exemplary implementation consistent with the principles of the invention. As illustrated, sensor 420 may include a bus 610, processing logic 620, a memory 630, and a communications interface 640. It will be appreciated that sensor 420 may include other components (not shown) that aid in receiving, transmitting, and/or processing data. Moreover, it will be appreciated that other configurations are possible.

Bus 610 may permit communication among the components of sensor 420. Processing logic 620 may include any type of processor or microprocessor that interprets and executes instructions. In other implementations, processing logic 620 may be implemented as or include an ASIC, FPGA, or the like. Memory 630 may include a RAM or another type of dynamic storage device that stores information and instructions for execution by processing logic 620 and/or a ROM or another type of static storage device that stores static information and instructions for processing logic 620. Communication interface 640 may include any transceiver-like mechanism that enables sensor 420 to communicate with other devices and/or systems. For example, communication interface 640 may include mechanisms for reading information from tags 410 and mechanisms for communicating with, for example, retail server 440.

As will be described in detail below, sensor 420 may perform functions in response to processing logic 620 executing software instructions contained in a computer-readable medium, such as memory 630. The software instructions may be read into memory 630 from another computer-readable medium or from another device via communication interface 640. The software instructions contained in memory 630 may cause processing logic 620 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Exemplary Server Configuration

Figure 7:
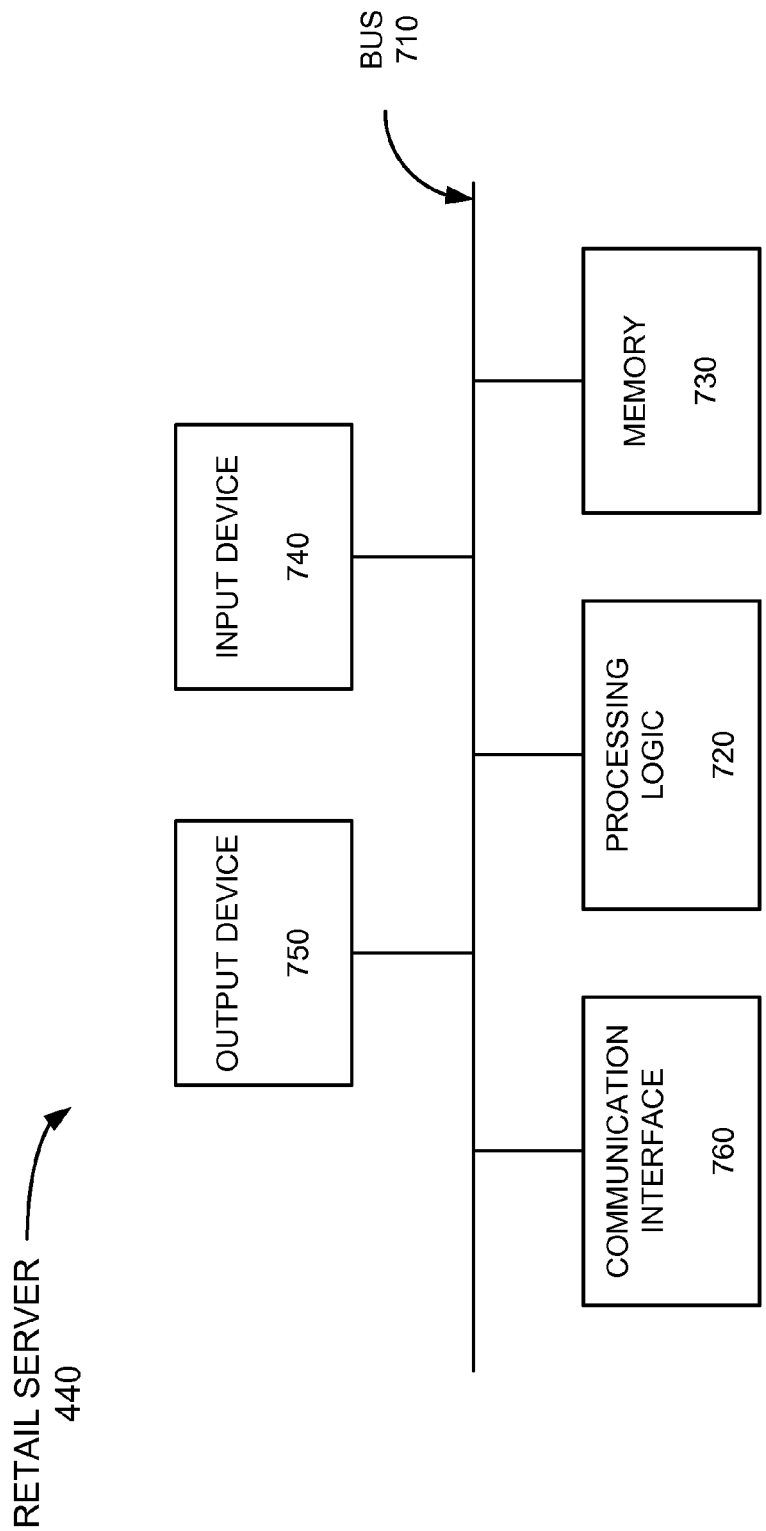
FIG. 7 illustrates an exemplary configuration of the retail server of FIG. 4 in an exemplary implementation consistent with the principles of the invention.

FIG. 7 illustrates an exemplary configuration of retail server 440 in an implementation consistent with the principles of the invention. As illustrated, retail server 440 may include a bus 710, processing logic 720, a memory 730, an input device 740, an output device 750, and a communication interface 760. It will be appreciated that retail server 440 may include other components (not shown) that aid in receiving, transmitting, and/or processing data. Moreover, it will be appreciated that other configurations are possible.

Bus 710 may permit communication among the components of retail server 440. Processing logic 720 may include any type of processor or microprocessor that interprets and executes instructions. In other implementations, processing logic 720 may be implemented as or include an ASIC, FPGA, or the like. Memory 730 may include a RAM or another type of dynamic storage device that stores information and instructions for execution by processing logic 720, a ROM or another type of static storage device that stores static information and instructions for the processing logic 720, and/or some other type of magnetic or optical recording medium and its corresponding drive for storing information and/or instructions.

Input device 740 may include a device that permits an operator to input information to server 440, such as a keyboard, a keypad, a mouse, a pen, a microphone, one or more biometric mechanisms, and the like. Output device 750 may include a device that outputs information to the operator, such as a display, a printer, a speaker, etc.

Communication interface 760 may include any transceiver-like mechanism that enables retail server 440 to communicate with other devices and/or systems. For example, communication interface 760 may include mechanisms for receiving information from and possibly transmitting information to sensors 420 and output devices 430. Moreover, retail server 440 may include mechanisms for communicating with centralized content server 120 via a network, such as network 110.

As will be described in detail below, retail server 440, consistent with the principles of the invention, may receive information from sensors 420 and provide content to customers via, for example, output devices 430, that relates to the information received from sensors 420. Retail server 440 may perform these and other services in response to processing logic 720 executing software instructions contained in a computer-readable medium, such as memory 730. The software instructions may be read into memory 730 from another computer-readable medium or from another device via communication interface 760. The software instructions contained in memory 730 may cause processing logic 720 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Figure 8:
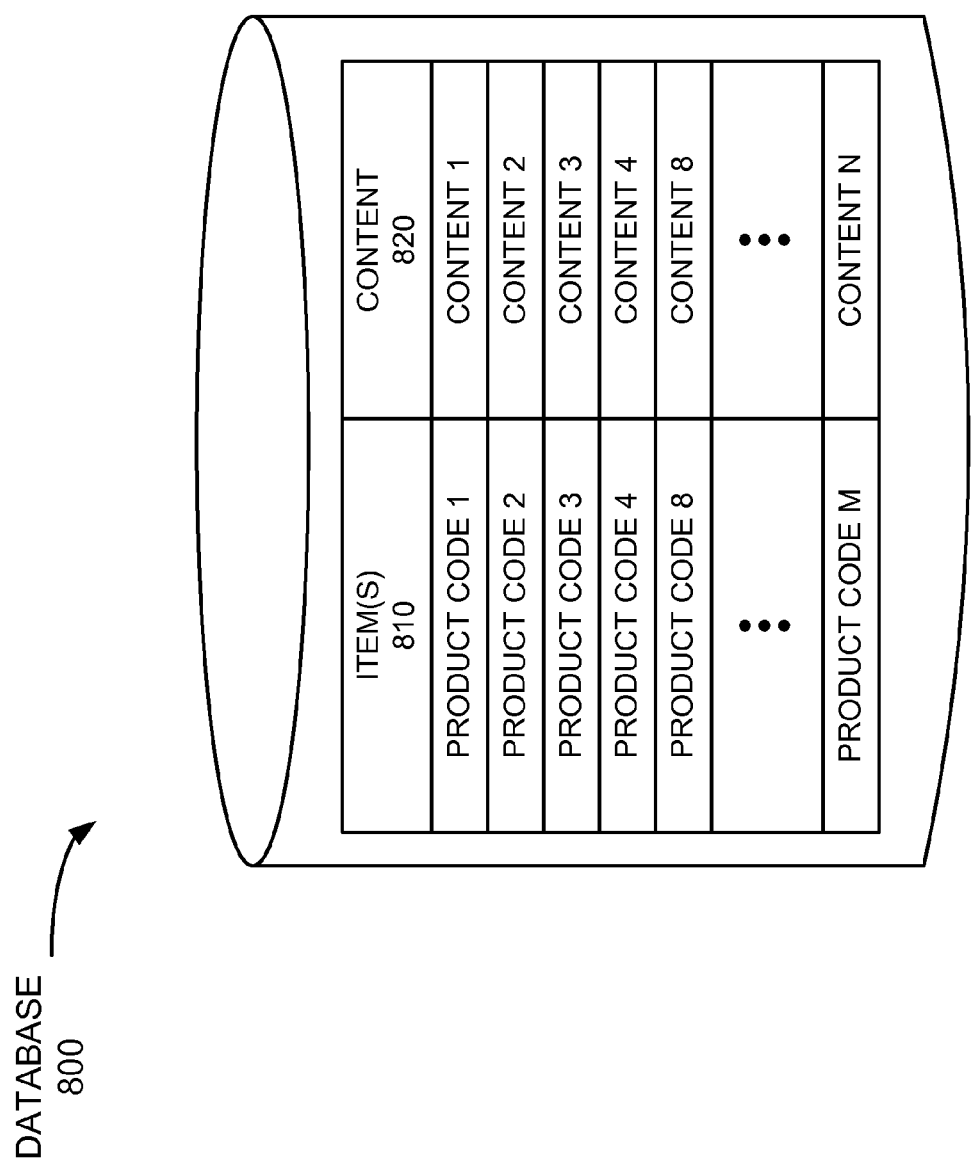
FIG. 8 illustrates an exemplary database that may be associated with the retail server of FIG. 4 in an implementation consistent with the principles of the invention.

FIG. 8 illustrates an exemplary diagram of a database 800 that may be associated with retail server 440 in an implementation consistent with the principles of the invention. While only one database is described below, it will be appreciated that database 800 may consist of multiple databases stored locally at retail server 440, or stored at one or more different and possibly remote locations.

As illustrated, database 800 may include a group of entries in the following exemplary fields: item field 810 and content field 820. Database 800 may contain additional fields (not shown) that aid retail server 440 in providing content to customers that relates to items with which the customers are associated (e.g., items that the customers intend to purchase).

Item field 810 may store information identifying one or more items that are available for purchase at retail location 140-1. For example, the item may include clothes, electronic devices, mechanical devices, grocery items, or any other type of item that may be purchased at retail location 140-1 with which database 800 is associated. The item may, for example, be identified in field 810 by name (e.g., television, running shoe, etc.) or as a product code (or some other unique identification code).

Content field 820 may identify the content that is to be provided to a customer when the item in item field 810 is detected by a sensor 420. The content may relate to the item or combination of items identified in field 810. For example, if the item identified in field 810 is a digital video disc (DVD) player, content field 820 may, for example, identify content relating to cables for connecting the DVD player to a television and/or DVD movies. As another example, if the item is a blue dress, the content may identify a particular pair of shoes that the retail location carries that perfectly matches the dress. As yet a further example, if the item is a computer, the content may identify one or more accessories for the computer, such as software, wireless keyboard and mouse, or the like.

In one implementation, the content may be based on other customers' past buying trends. For example, if customers who typically buy DVD players also buy surround sound systems, field 820 may store information identifying surround sound systems offered by the retail location. This type of buying trend may be determined or predicted, for example, by monitoring items that customers purchased together.

The content may include visual and/or audible content. For example, the content may include visual content, such as video or text, or audio content about an item. The content may also indicate the location of the item in the retail location to facilitate the customer's ability to obtain the item.

The content stored in content field 820 for each item (or combination of items) in field 810 may be configurable by an administrator and changed as often as is needed. For example, if DVD movies are currently on sale at the retail location with which database 800 is associated, an administrator may change the content in field 820 relating to DVD players in field 810 so that this sale item is presented to any customer intending to purchase a DVD player. Alternatively, as described above, this change in content may be provided to database 800 by centralized content server 120. When the sale is over, the administrator may, for example, change the content to identify other items that relate to DVD players (e.g., cables) that are available for purchase at the retail location.

As will be described in detail below, retail server 440 may use database 800 to provide relevant content to customers while they are still shopping at retail location 140-1. Retail server 440 may cause the content to be provided to the customer via an output device, such as device 430.

Exemplary Processing

Figure 9:
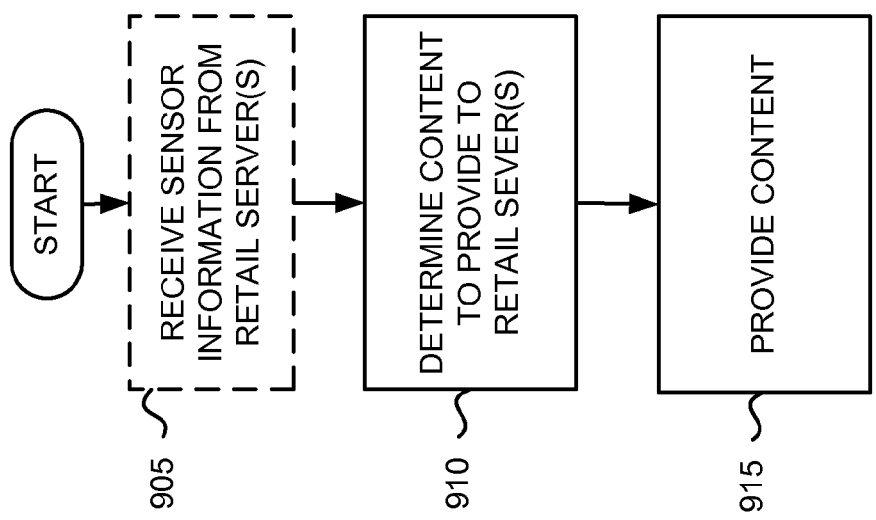
FIG. 9 illustrates an exemplary process for providing content to retail locations in an implementation consistent with the principles of the invention.

FIG. 9 illustrates an exemplary process for providing content to retail locations in an implementation consistent with the principles of the invention. Processing may begin with centralized content server 120 optionally receiving sensor information from one or more retail servers 440 (act 905). Retail servers 440 may receive sensor information from sensors 420 and forward that information to centralized content server 120. The sensor information may provide an indication of items of interest to customers.

Centralized content server 120 may determine content to provide to one or more retail servers 440 at retail locations 140 (act 910). In one implementation consistent with the principles of the invention, the particular content to provide to a retail server 440 may be based on sensor information received from the retail server or another retail server. For example, if the sensor information from a particular retail location 140-1 through 140-N indicates that a particular video game console is very popular, then content may be identified relating to video games for that video game console.

Once content has been determined, centralized content server 120 may provide the content to retail server(s) 440. The content may be provided automatically, for example, in response to some event, such as new content being identified for a particular retail server 440, or manually, for example, in response to an administrator causing centralized content server 120 to transmit the content to one or more retail servers 440.

Figure 10:
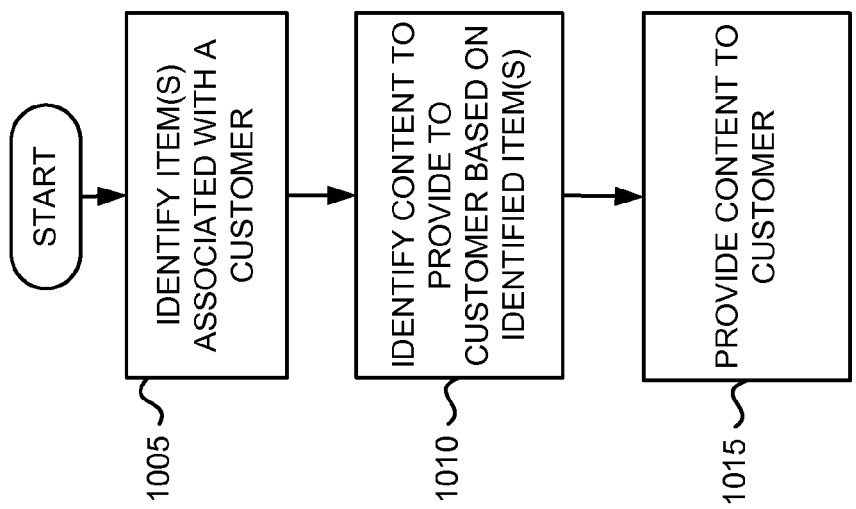
FIG. 10 illustrates an exemplary process for providing content to customers in an implementation consistent with the principles of the invention.

FIG. 10 illustrates an exemplary process for providing content to customers in an implementation consistent with the principles of the invention. Processing may begin with a sensor, such as a sensor 420, identifying an item (or combination of items) that is associated with a customer (act 1005). In one implementation, sensor 420 may identify that a customer has placed the item (or combination of items) in a shopping cart, a shopping basket, or is carrying the item when the customer brings the item within range of sensor 420. In each of these cases, it is assumed that the customer intends to purchase the item or is at least thinking about purchasing the item. For explanatory purposes, it is assumed hereafter that the customer has placed a DVD player into his/her shopping cart. When the DVD player comes in range of a sensor 420, sensor 420 may, for example, identify the DVD player by transmitting a signal to a tag 410 associated with the DVD player, which causes tag 410 to transmit back information to sensor 420. The information may include, for example, a product code number or other information that uniquely identifies the DVD player.

Sensor 420 may provide information to retail server 440 regarding the identified item. For example, sensor 420 may provide a product code number (or other unique identification code) associated with the item to retail server 440.

In some situations, sensor 420 may identify multiple items substantially simultaneously (e.g., when a customer has several items in their shopping cart or several customers carrying one or items comes in proximity to sensor 420 substantially simultaneously). In these situations, sensor 420 may provide information relating to all or some portion of the identified items to retail server 440.

Retail server 440 may identify content to provide to the customer based on the information from sensor 420 (act 1010). In one implementation, retail server 440 may identify the content using a database, such as database 800. For example, retail server 440 may lookup the content from database 800 that should be provided based on the information from sensor 420.

In those situations where sensor 420 provides information regarding multiple items to retail server 440, retail server 440 may, in one implementation consistent with the principles of the invention, use information relating to one of the items for identifying the appropriate content to provide to a customer. Retail server 440 may use one or more criteria for selecting the item in a group of items to use for identifying content. For example, the decision as to which item in a group of items should be selected for identifying content to provide to a customer may be based on the margin of the items (e.g., the item that provides the greatest margin may be selected), price of the items (e.g., the item that costs the most may be selected), the amount of promotion for the items (e.g., the item that is most heavily promoted may be selected), or a combination of these criteria (e.g., where some of the criterion may be weighted more heavily than other criterion) or other criteria. It will be appreciated that the selection criteria may be configurable and updated or changed at any time.

Retail server 440 may provide the appropriate content to the customer (act 1015). Retail server 440 may provide the content to the customer via any conventional technique. In one implementation, retail server 440 may provide the content to a device, such as output device 430, which can visually or audibly present the content to the customer. For example, output device 430 may audibly and/or visually provide an advertisement for an item at the retail location to the customer. Output device 430 may also or alternatively provide a printed coupon to the customer for one or more items at the retail location. The coupon may be for the detected item or another item at the retail location. In this way, anonymous customers may be enticed into buying additional items before the point of sale, thereby improving in-store sales.

Figure 11:
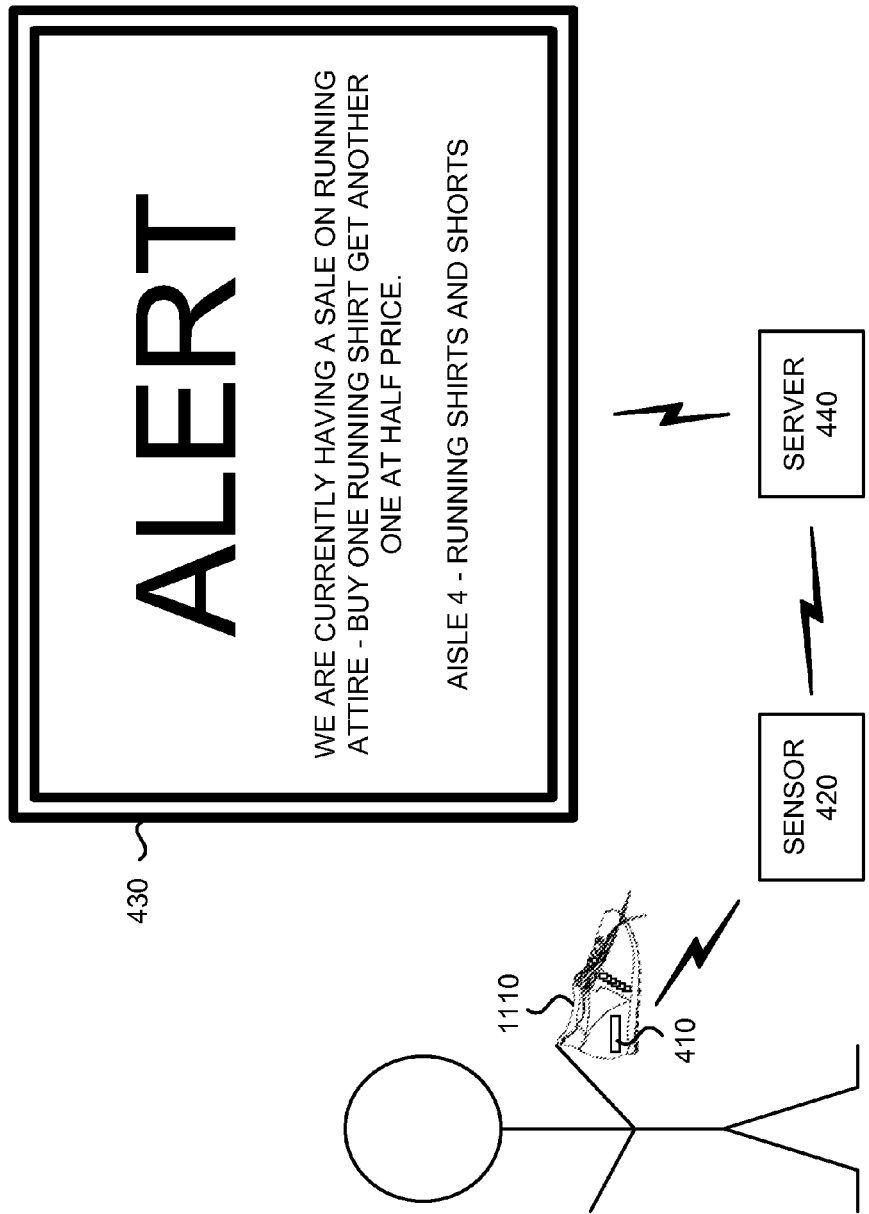
FIG. 11 illustrates an exemplary shopping scenario consistent with the principles of the invention.

The following example illustrates the above processing. Assume for this example that a customer picks up a pair of running shoes 1110 to purchase, as illustrated in FIG. 11. Running shoes 1110 include a tag 410. Assume that the customer comes within range of a sensor 420, causing sensor 420 to detect the pair of running shoes 1110. Upon reading tag 410, sensor 420 may send information regarding running shoes 1110 to retail server 440. In one implementation, sensor 420 may simply forward information received from tag 410 to retail server 440. Retail server 440 may then identify content to provide to the customer. In the example illustrated in FIG. 11, the content may include information regarding a sale on running attire. Retail server 440 may then cause this content to be presented to the customer. For example, retail server 440 may send the content to an output device 430 that either visually or audibly presents the content to the customer. The content may entice the anonymous customer to purchase additional items from the retail location while the customer is shopping at the retail location (e.g., before the point of sale).

Figure 12:
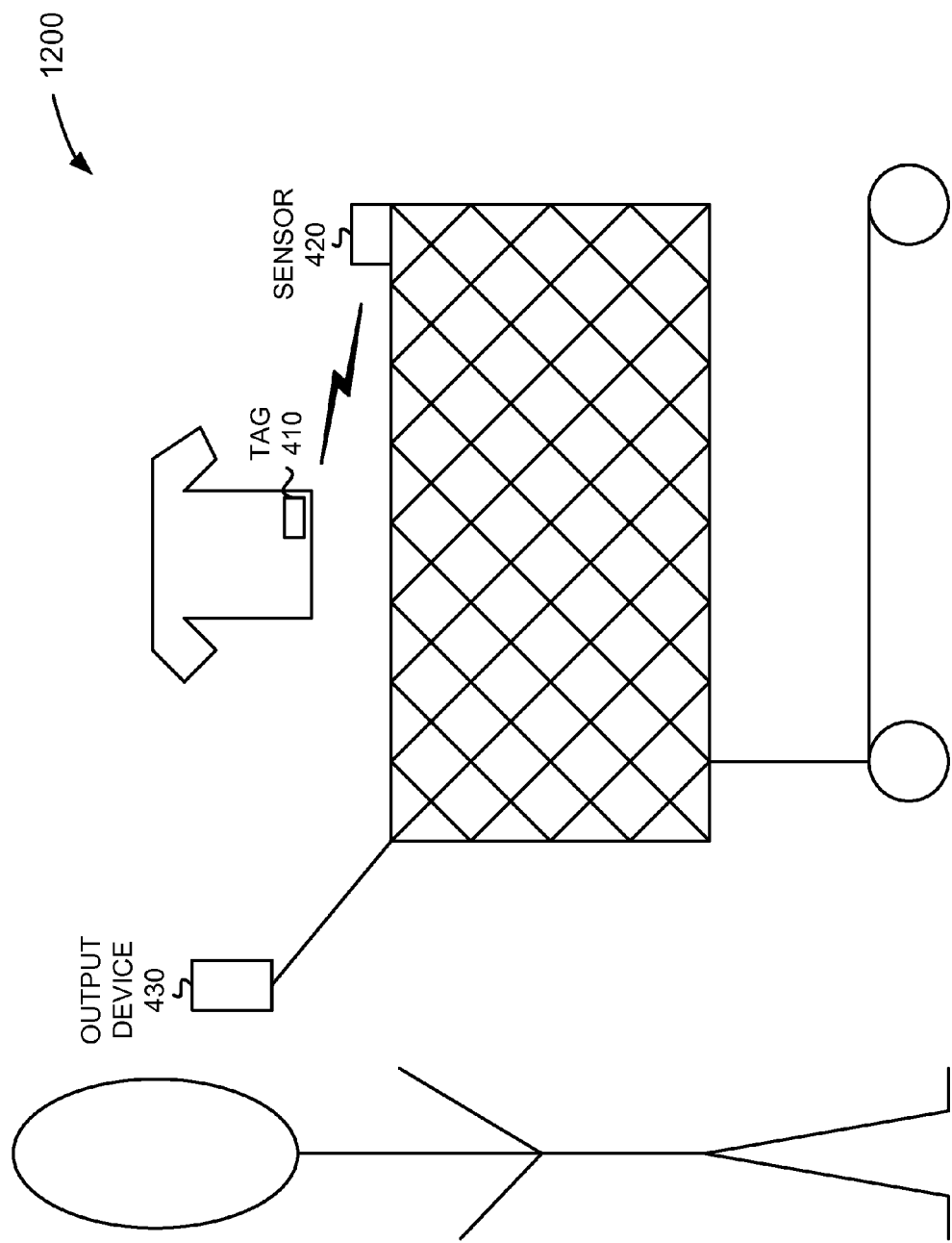
FIG. 12 illustrates an exemplary system consistent with other implementations of the invention.

Although the above implementations described sensors 420 and output devices 430 being located at certain locations throughout a retail location 140-1 through 140-N, it will be appreciated that other configurations are possible. For example, FIG. 12 illustrates an exemplary system 1200 consistent with other implementations of the invention. As illustrated, one or more sensors 420 and/or output devices 430 may be attached to a shopping cart (or shopping basket) via any well-known technique. In this way, sensor 420 may identify an item placed into the shopping cart by, for example, reading tag 410 associated with the item. Sensor 420 may forward information identifying the item to retail server 440. Retail server 440 may identify content to provide to the customer based on the information from sensor 420. Retail server 440 may provide the identified content to the customer via output device 430 to thereby entice the customer to purchase additional items prior to the customer reaching the cash register.

CONCLUSION

Implementations consistent with the principles of the invention provide content to anonymous customers while shopping at a store. The content may relate to an item that the customer intends to purchase. The content is provided in order to entice the customer to buy additional items from the store.

The foregoing description of exemplary implementations of the invention provides illustration and description, but is not intended to be exhaustive or to limit the invention to the precise form disclosed. Modifications and variations are possible in light of the above teachings or may be acquired from practice of the invention. For example, while the above description focused on providing content to customers shopping at a store, implementations consistent with the invention are not so limited. For example, implementations consistent with the principles of the invention may use the above techniques to direct other types of useful content to users, such as map information, status items, warnings, etc. As one example, a person entering a national park may be given a tag, such as tag 410. The national park may include sensors, such as sensors 420, and output devices, such as output devices 430, to provide the person with information as to their location within the park, the location of emergency personnel and/or wild life (e.g., the emergency personnel and/or wild life may be associated with tags that enable their locations to be identified), restrooms, etc. As another example, an amusement park, a shopping mall, or other similar establishments may provide tags 410 to customers. A parent may attach one of the tags to a child (e.g., as a wristband) to be able to track the location of the child within the amusement park, shopping mall, etc.

Moreover, while the above description focused on detecting items using radio frequency technology, implementations consistent with the invention are not so limited. The techniques described herein are equally applicable to other technologies, such as infrared technology.

While series of acts have been described with respect to FIGS. 9 and 10, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a computer system, the method comprising:
    reading, via a device associated with the computer system, a first tag associated with a first item that a customer has selected for purchasing;
    reading, via the device, a second tag associated with a second item substantially simultaneously with the reading the first tag;
    selecting, by a processor of the computer system, the first item or the second item;
    using, by the processor, the selected first item or second item for identifying content and
    presenting, by an output device of the computer system, content to the customer in response to the reading, the content identifying a third item relating to the selected first item or second item.

2. The method of claim 1, where the content includes at least one of:
    an indication that the third item is on sale;
    information about a location of the third item;
    information about a relationship between the third item and the selected first item or second item; or
    a coupon relating to the third item.

3. The method of claim 1, where the first item or the second item is selected based on at least one of:
    a margin of the first item and a margin of the second item;
    a price of the first item and a price of the second item; or an amount of promotion of the first item and an amount of promotion of the second item.

4. The method of claim 1, where the third item is selected based on at least one of:
 a history of past purchases associated with the selected first item or second item and the third item; or
 information about past purchases of the third item received from retail locations that sell the third item.

5. The method of claim 1, where the presenting includes displaying the content to the customer.

6. The method of claim 1, where the presenting includes audibly providing the content to the customer.

7. The method of claim 1, where the presenting includes printing a coupon associated with at least one of the selected first item or second item or the third item.

8. The method of claim 1, where the device is located within a retail establishment and where the computer system is located externally from the retail establishment.

9. The method of claim 1, where the content is identified by accessing a database that stores information relating product codes representing items for sale to information about the items for sale.

10. The method of claim 9, where the information about the items for sale includes information about related items for sale.

11. The method of claim 9, where the reading a first tag causes the first tag to transmit a product code associated with the first item to the device.

12. The method of claim 9, where the information about the items for sale is updated based on information received from a retail server associated with a particular retail location.

13. The method of claim 1, where the device includes the output device.

14. A system comprising:
 a mobile sensor device;
 a server device; and
 an output device;
 where the mobile sensor device:
  reads tags associated with items for sale in a retail location;
  receives product codes from the read tags; and
  sends the received product codes to the server device;
 where the server device:
  receives the product codes from the mobile sensor device;
  selects a particular product code if multiple product codes are received substantially simultaneously; and
  identifies content relating to a particular item to provide to the output device based on the selected product code; and
 where the output device:
  receives identified content relating to the particular item from the server device; and
  outputs the content relating to the particular item.

15. The system of claim 14, where the mobile sensor device includes the output device.

16. The system of claim 14, where the server device is located externally to the retail location.

17. The system of claim 14, where the server device selects a particular product code based on at least one of:
 margins associated with the received product codes;
 prices associated with the received product codes; or
 amounts of promotion associated with the received product codes.

18. The system of claim 14, where the content relating to the particular item includes at least one of:

an indication that the particular item is on sale;
information about a location of the particular item;
information about a relationship between the particular item and an item associated with the selected particular product code; or
a coupon relating to the particular item.

19. The system of claim 14, where the output device outputs the content relating to the particular item by at least one of:
 displaying the content;
 audibly providing the content; or
 printing the content.

20. One or more memory devices storing instructions executable by one or more processors, the one or more memory devices comprising:
 one or more instructions to receive, from a sensor device located in a retail location, a first tag associated with a first item for sale at the retail location;
 one or more instructions to receive, from the sensor device, a second tag associated with a second item for sale at the retail location;
 one or more instructions to select the first item or the second item, based on at least one of a price of the first item and a price of the second item, a margin of the first item and a margin of the second item, or an amount of promotion of the first item and an amount of promotion of the second item;
 one or more instructions to identify content to present to a customer, the content identifying a third item relating to the selected first item or second item; and
 one or more instructions to cause the identified content to be provided to the customer.

21. A computer readable medium storing instructions executable by a computer system processor, the instructions causing the processor to perform the steps of:
 reading, via a device associated with the computer system, a first tag associated with a first item that a customer has selected for purchasing;
 reading, via the device, a second tag associated with a second item substantially simultaneously with the reading the first tag;
 selecting, by the processor of the computer system, the first item or the second item;
 using, by the processor, the selected first item or second item for identifying content; and
 presenting, by an output device of the computer system, content to the customer in response to the reading, the content identifying a third item relating to the selected first item or second item.

22. The computer readable medium of claim 21, where the content includes at least one of:
 an indication that the third item is on sale;
 information about a location of the third item;
 information about a relationship between the third item and the selected first item or second item; or
 a coupon relating to the third item.

23. The computer readable medium of claim 21, where the first item or the second item is selected based on at least one of:
 a margin of the first item and a margin of the second item;
 a price of the first item and a price of the second item; or
 an amount of promotion of the first item and an amount of promotion of the second item.

24. The computer readable medium of claim 21, where the third item is selected based on at least one of:
 a history of past purchases associated with the selected first item or second item and the third item; or information about past purchases of the third item received from retail locations that sell the third item.

25. The computer readable medium of claim 21, where the presenting includes displaying the content to the customer.

26. The computer readable medium of claim 21, where the presenting includes audibly providing the content to the customer.

27. The computer readable medium of claim 21, where the presenting includes printing a coupon associated with at least one of the selected first item or second item or the third item.

28. The computer readable medium of claim 21, where the device is located within a retail establishment and where the computer system is located externally from the retail establishment.

29. The computer readable medium of claim 21, where the content is identified by accessing a database that stores information relating product codes representing items for sale to information about the items for sale.

30. The computer readable medium of claim 29, where the information about the items for sale includes information about related items for sale.

31. The computer readable medium of claim 29, where the reading a first tag causes the first tag to transmit a product code associated with the first item to the device.

32. The computer readable medium of claim 29, where the information about the items for sale is updated based on information received from a retail server associated with a particular retail location.

33. The computer readable medium of claim 21, where the device includes the output device.

* * * * *